United States Patent
Chesla

(10) Patent No.: US 8,566,936 B2
(45) Date of Patent: Oct. 22, 2013

(54) MULTI DIMENSIONAL ATTACK DECISION SYSTEM AND METHOD THEREOF

(75) Inventor: Avi Chesla, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 9 days.

(21) Appl. No.: 13/306,360

(22) Filed: Nov. 29, 2011

(65) Prior Publication Data

US 2013/0139214 A1    May 30, 2013

(51) Int. Cl.
*H04L 29/14* (2006.01)
*H04L 29/08* (2006.01)

(52) U.S. Cl.
USPC .............................................. 726/22; 726/25

(58) Field of Classification Search
None
See application file for complete search history.

(56) References Cited

PUBLICATIONS

EigenBot: Foiling Spamming Botnets with Matrix Algebra. Mao et al. ISI-KDD' 12. Aug. 12, 2012.*
The need for a REAL Defensive Information Operations Capability. Ruchie, Mark J., SANS Institute 2002. Apr. 22, 2012.*

* cited by examiner

*Primary Examiner* — Venkat Perungavoor
(74) *Attorney, Agent, or Firm* — Myers Wolin, LLC

(57) ABSTRACT

A method and system for protecting a protected entity using a multi-dimensional protection surface are provided. According to various embodiments, the multi-dimensional protection surface is generated by correlating multiple inputs related to the at least one detected attack. The inputs include at least one input identifying the detected attack and another input identifying each attack tool that performs the detected attack. The generated protection multi-dimensional surface includes protection points, where each such point defines at least one attack mitigation action to mitigate the detected attack.

22 Claims, 6 Drawing Sheets

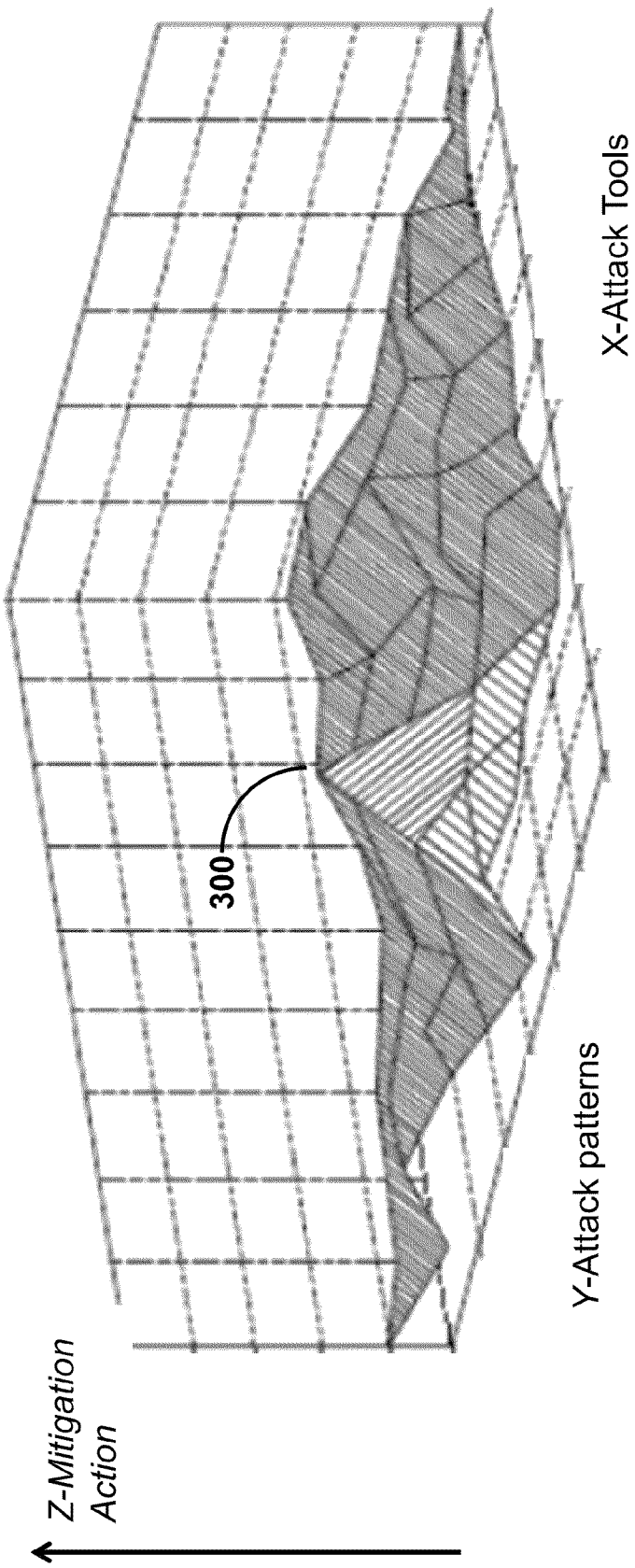

MULTI DIMENSIONAL ATTACK DECISION SYSTEM AND METHOD THEREOF

TECHNICAL FIELD

This invention generally relates to generating security policies for protection of computing and network resources based on multi dimensional attack decision tools.

BACKGROUND OF THE INVENTION

A significant problem facing the Internet community is that on-line businesses and organizations are vulnerable to malicious attacks. Recently, attacks have been committed using a wide arsenal of attack techniques and tools targeting both the information maintained by the on-line businesses and their IT infrastructure. For example, recently identified attacks were committed using a combination of attack techniques at the network and application levels. In most cases, various attacks have been executed simultaneously in order to conduct a successful attack campaign against the target. Attackers use different tools to execute different attack techniques. Each such attack tool is designed to exploit weaknesses identified in one of the target's defense layers.

The scale of recent attacks has also been increased to include a multitude number of infected machines and groups of organized attackers who take part in a coordinated attack campaign. Thus, it has become a significant challenge to secure online businesses and organizations against targeted attack campaigns.

There are many different security systems designed to identify and mitigate attacks. However, typically each solution is designed to protect a single layer of the protected entity. For example, anti-virus programs may protect attacks in the form of viruses, worms, and/or Trojan horses. However, anti-virus programs cannot be efficient against network type attacks, such as denial-of-service (DoS), system intrusions, and the like which are typically handled by firewalls, intrusion prevention systems (IPS), or network appliances.

Most security systems detect attacks based on predefined patterns. The pattern may be related to the attack (e.g., a signature), to the behavior of the protected entity (e.g., a normal request rate, incoming and outgoing traffic attributes, etc.), and/or the behavior of the attack tool. Typically, a security system is configured with one or more policies that define a detection attack pattern and a mitigation action to be performed once a potential attack has been identified. For example, an attack pattern for detecting a DoS attack may be based on an average packet rate of an incoming traffic, while the mitigation action would be to drop incoming packets.

The disadvantage of this approach is that the security systems are limited to a "one dimensional" policy or attack rule. That is, currently available security systems, in most cases, take into consideration only the detection attack pattern without correlation to other inputs that can be utilized for better detection. Some security solutions consider attack patterns of the normal behavior of the protected entity (e.g., a web application, a server) and to the properties of the attacks. However, the major drawback of existing security solutions is that the detection and mitigation of attacks is not based on the attack tools that generated the attack and their operational limitations (weaknesses). As a result, existing security solutions do not provide any means for executing mitigation actions against the attack tools that generated the attack to exploit the operational limitations of such tools.

Thus, in today's environment where large scale attack campaigns are targeted against on-line businesses and organizations, existing security solutions may not be efficient for mitigating attack campaigns.

It would be, therefore, advantageous to provide a security solution for detecting and mitigating attacks based on a multi-dimensional policy. It would be further advantageous if the proposed security solution would mitigate attacks based on the tool that generated the attacks, by exploiting the tool's operational limitations.

SUMMARY OF THE INVENTION

Certain embodiments of the disclosed herein include a security system for protecting a protected entity using a multi-dimensional protection surface. The security system includes a detection module for detecting at least one potential attack against the protected entity in incoming data traffic directed to the protected entity, wherein the detection module further detects a type of each attack tool committing the at least one potential attack; a data repository for storing at least a list of attack tools and for each of the attack tools its' operational limitation with respect of each attack that can be performed by the attack tool; a correlation module for generating at least a multi-dimensional protection surface by correlating a plurality of inputs related to the at least one detected attack, wherein the plurality of inputs include at least a first input identifying the at least one detected attack and a second input identifying each attack tool that performs the at least one detected attack, wherein the protection multi-dimensional surface includes at least one protection point that defines at least one attack mitigation action to mitigate the at least one detected attack; and a mitigation module for executing the at least one attack mitigation action defined in the multi-dimensional protection surface.

Certain embodiments of the disclosed herein also include a method for protecting a protected entity using a multi-dimensional protection surface. The method comprises detecting at least one potential attack against the protected entity in incoming data traffic directed to the protected entity; detecting a type of each attack tool committing the at least one potential attack; generating a multi-dimensional protection surface by correlating a plurality of inputs related to the at least one detected attack, wherein the plurality of inputs include at least a first input identifying the at least one detected attack and a second input identifying each attack tool that performs the at least one detected attack, wherein the protection multi-dimensional surface includes at least one protection point that defines at least one attack mitigation action to mitigate the at least one detected attack; and executing the at least one attack mitigation action defined in the multi-dimensional protection surface.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIGS. 3A, 3B and 3C are exemplary multi-dimensional protection surfaces generated according to an embodiment of the invention.

DETAILED DESCRIPTION OF THE INVENTION

Figure 1:
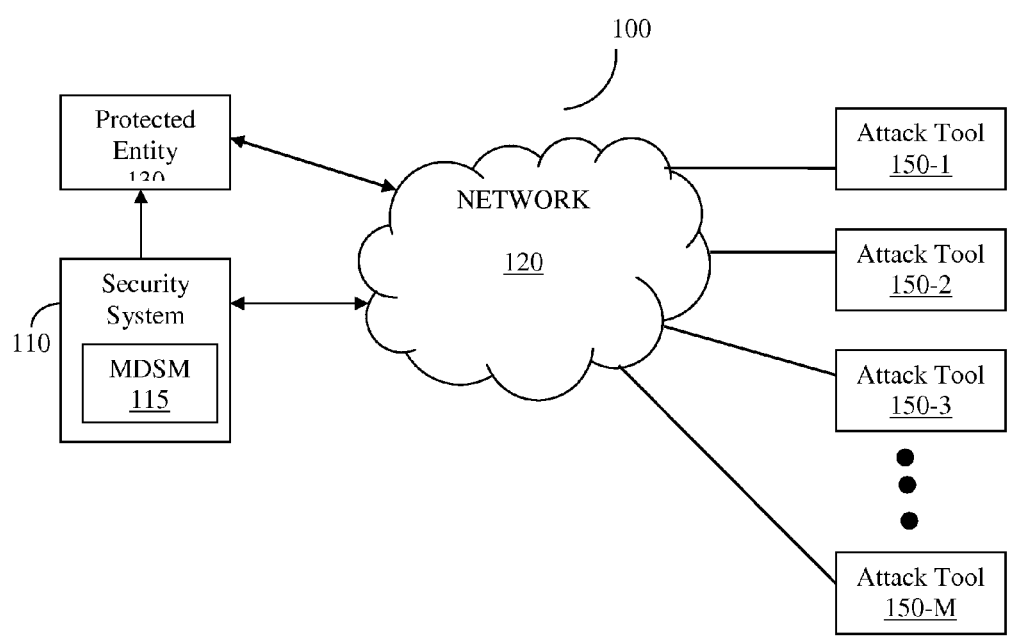
FIG. 1 illustrates a typical deployment of an application level security system.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 illustrates a typical deployment 100 of a security system 110 utilized to describe various embodiments of the invention. The security system 110 is connected to a network 120 and a protected entity 130 being secured by the security system 110. The network 120 may be, but is not limited to, a local area network, a wide area network, the Internet, a cellular network, and a metropolitan area network (MAN), or any combination thereof.

The protected entity 130 may be, but is not limited to, a computer, a web server, a mail server, an FTP server, a SIP server, a DNS server, a Media server a database server, a datacenter, network infrastructure components such as links, routers, switches, and the like. The deployment of the security system 110 may be an inline or a scrubbing-centers deployment.

The security system 110 may be any type of device or appliance that is operable in the network and capable of identifying and mitigating attacks committed by one or more of the attack tools 150-1 through 150-M. For example, the security system 110 may be a firewall, an IPS, an anti-DoS device, and the like. The security system 110 performs at least a behavioral analysis and can execute one or more mitigation actions. According to an embodiment of the invention, the security system 110 implements a multi-dimensional security mechanism (MDSM) 115. As will be described in detail below the MDSM 115 is designed to secure the protected entity 130, by applying one or more multi-dimensional protection surfaces based, in part, on the detection attack patterns and the attack tools that generated the attack and their identified weaknesses.

The attack tools 150-1 through 150-M can be any type of computing device that can generate a malicious attack against the protected entity 130. An attack tool 150-i can be a dedicated tool for performing an attack or can be an infected device. An infected device may be, for example, a computer, a mobile phone, a smart phone, and the like that is infected with a malware that sends malicious traffic automatically or upon demand coming from an attack controller. As mentioned above, in a large scale attack campaign a vast number of attack tools can participate in attacking the protected entity, each of which may perform a different type of attack or attacks related to the same type. For example, attack tools 150-1 and 150-M may perform an application level DoS attack, tool 150-2 may perform a network based DDoS attack, and tool 150-3 may execute an HTTP scan type of attack. Each attack tool 150-1 through 150-M has a recognizable fingerprint invariant to the attack content itself.

It should be noted that each attack tool 150-i has a certain weakness. Specifically, a tool for each generated attack has at least one operational limitation (weakness) depending on the type of attack being generated. For example, a HTTP based flood would be characterized with a limitation being different from a limitation of a UDP flood attack generated by same attack tool.

According to one embodiment, the knowledge about the weakness of the attack tool 150-i is considered by the MDSM 115 when selecting the proper action to mitigate the attack. That is, the MDSM 115 performs a mitigation action that would best exploit the weakness of the attack tool or tools attacking the protected entity 130.

Figure 2:
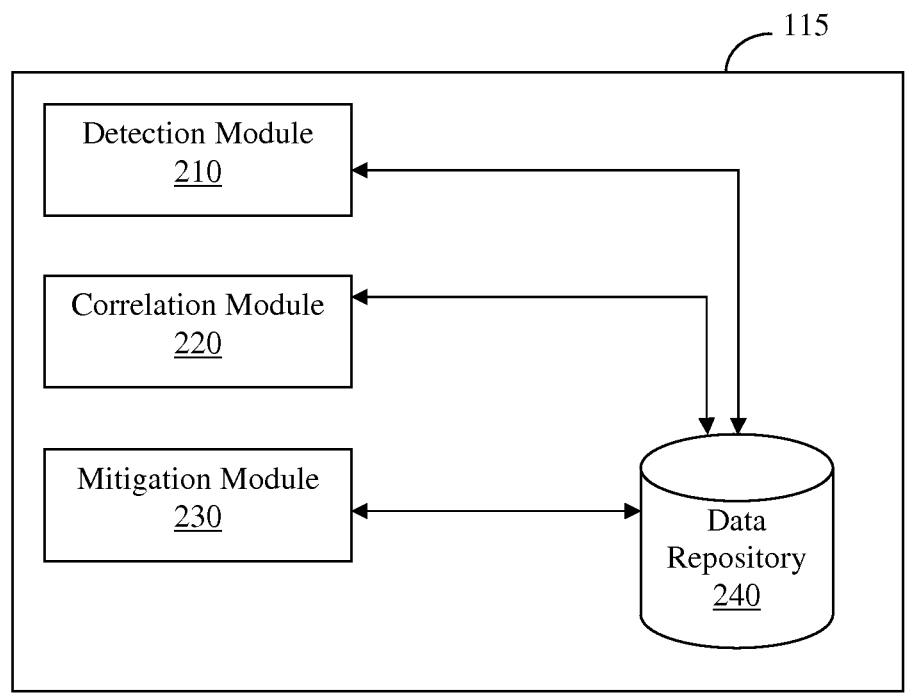
FIG. 2 is a block diagram of the multi-dimensional security mechanism according to an embodiment of the invention.

FIG. 2 shows a non-limiting and exemplary block diagram of the MDSM 115 according to an embodiment of the invention. The MDSM 115 includes a detection module 210, a correlation module 220, a mitigation module 230, and a data repository 240, which may be any tangible readable medium for storing digital data.

The detection module 210 receives traffic directed to the protected entity 130 and detects if the traffic includes a potential threat. The detection module 210 can detect any type of malicious attacks including, but not limited to, network-based DoS, application-based DoS, network scanning, application scanning (e.g., application vulnerability scans, Brute-force attacks), intrusion attempts, viruses, worms, and so on. The detection module 210 may utilize techniques that are known to one of ordinary skill in detecting such attacks, for example, threats based on an attack's signatures and behavior patterns.

According to one embodiment, the detection module 210 further detects each tool 150-i that commits a detected attack. As mentioned above, each attack tool 150-i is characterized with a fingerprint that is invariant to the attack content. A detection of the attack tool can be performed by various pattern matching algorithms to identify a fingerprint associated with the attack tool. The detection module 210 may also implement various techniques for, e.g., statistical analysis to detect behavioral based attacks that cannot be identified by the pattern matching algorithms.

The data repository 240 includes information for assisting in detection of threats and tools. That is, the data repository 240 maintains a list of fingerprints of attack tools, signature of attacks, and any information that can be utilized in detection of attacks. The data repository 240 may be dynamically updated when new tools and/or attack types have been identified.

According to an embodiment of the invention, the data repository 240 also contains a list of mitigation actions that can be performed against the tool 150-i that participates in the attack. As mentioned above, each tool 150-i has a certain weakness that can be exploited to counteract the tool, thus mitigating and blocking the attack. In a non-limiting implementation, the data repository 240 includes a plurality of entries, each of which is an association of an attack tool name, its fingerprint, a type of attack, and a counter mitigation action.

In another embodiment, the data repository 240 includes security policies. Each policy may define a different set of mitigation actions per identified threat and further, at least one condition for executing the mitigation actions. A security policy, as will be described below, is generated based on a protection surface generated by the correlation module 220.

The correlation module 220 implements a multi dimensional attack decision to generate the protection surface based on a plurality of inputs. That is, the protection surface's plane is constructed from at least 2 inputs.

Figure 3A:
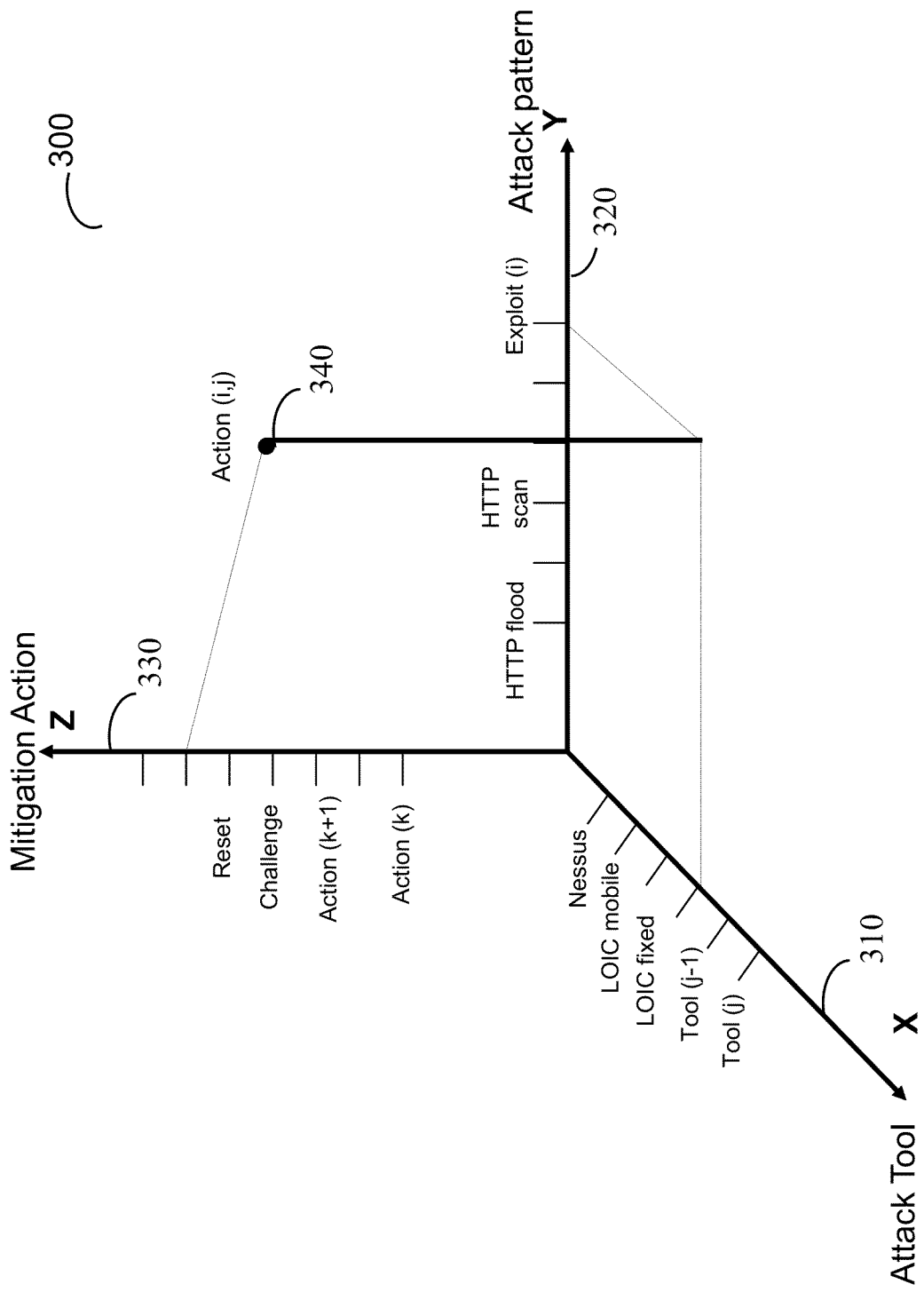

FIG. 3A shows an exemplary 2-dimensional protection surface generated according to an embodiment of the invention. The surface's plane includes at least one input, X-axis 310, representing an identified attack-tool pattern and another input, Y-axis 320, representing a behavior attack pattern. The Z-Axis 330 includes attack mitigation techniques. Each of the inputs is independent of the other.

Each point, a surface protection point 340, on the X-Y plane is associated with an entry index on the Z-Axis 330. A surface protection point 340 determines the best mitigation action to apply against the threat. Thus, the surface protection point 340 and the mitigation action are selected based on the association of at least both an attack index (as identified by the system 200), X-axis input, and the attack tool that committed the attack, Y-Axis input. Thus, the protection surface generated by the correlation module 220 provides higher detection and mitigation accuracy. An illustration of a protection surface 300 that was generated for the inputs X and Y and the output Z defined in FIG. 3A is provided in FIG. 3B.

It should be noted that setting the surface point allows stopping persistent attack events in a very effective manner. It has been proven that applying the right mitigation action against the attack, being generated by a specific attack tool, can significantly slow the attacker tool, until such tool becomes disabled. Furthermore, applying the right action enables "end-to-end" attack mitigation beyond the security 110 perimeter of protection. This is especially valuable when dealing with high volume DoS attacks that should be mitigated at the origin.

In addition, determining the right mitigation action (by setting the surface point 340) allows improving the performance of the security system 110 as less attack events would have to proceed by the security system 110, once the source of the attack has been eliminated.

Referring back to FIG. 2. The correlation module 220 receives from the detection module 210 a list of detected attacks and the tools 150-1 to 150-M that preformed the attacks. The correlation module 220 can also receive additional information that may assist in detecting and blocking potential threats, for example, network addresses of the source traffic, application attributes associated with the protocol of the incoming traffic (e.g., protocol type, cookies, etc.), and so on. Based on the received inputs, the correlation module 220 performs N-dimensional correlation to determine the protection surface and optimal protection surface point (e.g., point 340). In another embodiment, the protection surface is pre-generated based on all possible known combinations of attacks and attack tools, where the protection point is set based on the current identified attack and tool that generated the attack.

For example, in order to produce the protection surface (e.g., surface 300), the correlation module 220 receives the detected attack and a tool to place a point on the X-Y plane. Then, based on the correlation of the detected attack and tool, the appropriate mitigation action to handle the threat is selected, thereby setting the protection surface point 340. The selection of the appropriate mitigation action may be based on learnt information saved in the repository 240, a predefined set of correlation rules, an optimization process, or combination thereof. The predefined correlation rule provides ad hoc customization to the protection surface. An example for such a correlation rule is given below.

The optimization process, in an exemplary embodiment, selects one mitigation action out of a predefined set of suitable mitigation actions, applies the selected mitigation action, determines the effectiveness of the mitigation action over a predefined period of time, and assigns a score to the effectiveness of the mitigation. The process is repeated for each of the suitable mitigation actions, where eventually the action that achieved the highest "effectiveness score" is selected as the mitigation action.

In another exemplary embodiment, the optimization process selects a first action from a pre-defined set of possible mitigation actions. Then, at least one of the bandwidth, packet per second (PPS) and new connections per second (CPS) that are generated by the attack tool in response to this mitigation action are measured. Based on the measured values, an effectiveness score is computed and assigned to the current mitigation action. The effectiveness score, in one embodiment, is based on a weighted average of these traffic parameter measurements. Thereafter, for each mitigation action in the predefined set, the traffic parameters are measured and the effectiveness score is computed and assigned. Finally, the mitigation action respective of the highest effectiveness score, i.e., the most effective mitigation action per a combination of detected tool and attack, is set. The lowest weighted average represents the highest effectiveness score.

Figure 3C:
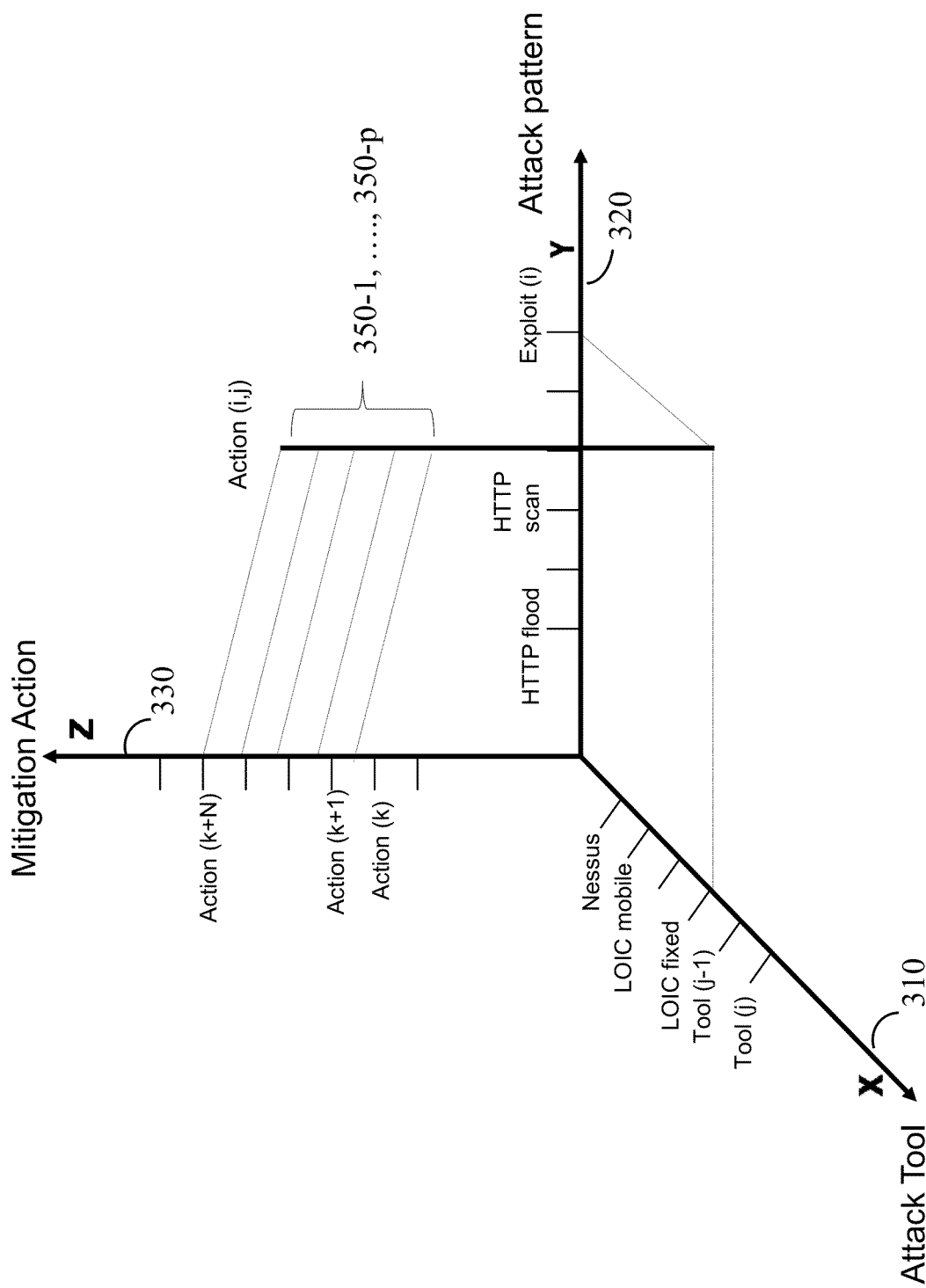

It should be noted that the correlation module 220 may generate a set of surface protection points, such as points 350-1, . . . , 350-$p$ shown, for example, in FIG. 3C. Each of the surface protection points 350-1, . . . , 350-$p$ can define different mitigation actions against a correlation of the same attack pattern and tool, such actions being applied sequentially against the threat. This approach may be advantageous when different mitigation actions can effectively block the attack and not enough information has been gathered to select the optimal mitigation action. In one embodiment, the optimal mitigation action from the actions related to the surface protection points, such as points 350-1, . . . , 350-$p$ is determined using the optimization process described above.

It should be further noted that other dimensions can be utilized in the protection surface 300 other than the exemplary dimensions shown in FIGS. 3A, 3B, and 3C. For example, other dimensions may include location of the attack tool, location of the protection entity, time, severity of the attack, blocking priorities, and so on. These additional dimensions can provide additional information when the mitigation decision is taken. For example, in a certain hour in a day, and day in a week, different mitigation actions can be performed.

Referring back to FIG. 2. The mitigation module 230 performs one or more mitigation actions defined by the one or more protection surface points set by the correlation module 220. The mitigation module 230 can perform any of the conventional techniques for blocking potential threats, for example, denying unauthorized access attempts, shaping the traffic, dropping packets, blocking incoming traffic, generating challenge/response action (e.g., 302 redirect, Java-script web challenge), manipulation of the server's TCP receiving window, and so on.

In accordance with another embodiment, the mitigation module 230 executes counter attacks against the identified attack tools. This is performed in order to exploit the drawbacks of the attack tools and halt their operation. Thus, a mitigation action is selected to achieve a maximum counter attack's impact.

For example, attack tools that rely on the operating system's TCP congestion control algorithm usually include a weakness allowing the generation of a counterattack action that can overload the TCP stack and CPU resources where such tools reside. Specifically, an attack tool that generates a TCP connection congestion control mechanism is designed to transfer larger chunks of traffic (packets) as long as no traffic congestion is identified (e.g., no packet drops, relativity short round trip time etc.). On the other hand, when the congestion avoidance algorithm identifies congestion, it automatically slows the data transmission rate per each TCP connection and gradually accelerates the data transmission rate back once the congestion ceases to exist. This process, known as congestion control, is based on different known congestion avoidance algorithms, such as a "slow-start" algorithm.

When an attack tool tries to generate new attack connections or retransmit data in an existing connection, the counter mitigation action causes the initiation of the slow-start process for every new TCP connection and/or initiation of congestion control process for existing connections. Then, the lifetime of each attack connection will become longer. This creates an increasing number of TCP simultaneous connections that eventually exhaust the computing resources of the attack tool.

In certain embodiments the system 200 can be in a distributed form where various components of the system 200 are implemented as stand-alone sub-systems located across the network. Further, the protection surface can be performed based on correlation of information from various detection sub-systems distributed across the network and between remote networks. Moreover, mitigation actions can be performed by mitigation sub-systems distributed across the network.

Figure 4:
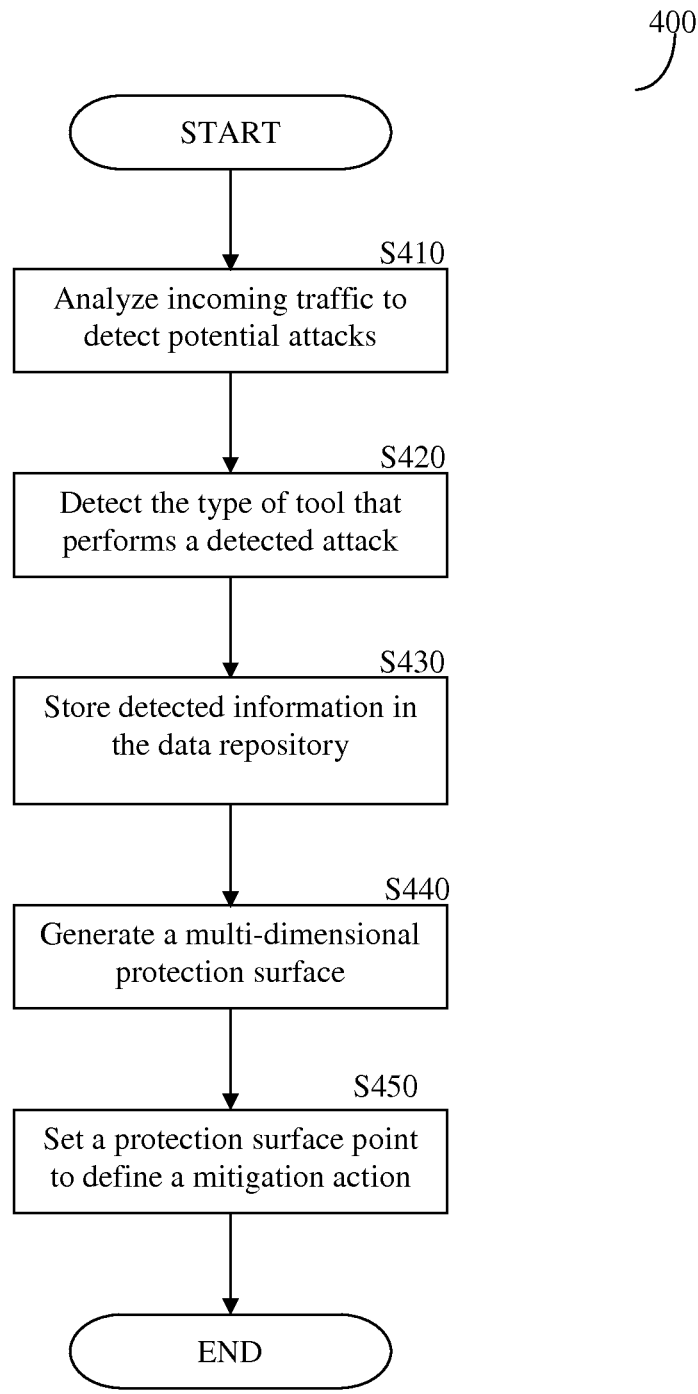
FIG. 4 is a flowchart describing a method for generating an enforceable security policy based on a multi-dimensional protection surface according to an embodiment of the invention.

FIG. 4 shows an exemplary and non-limiting flowchart 400 describing a method for generating a mitigation action, preferably a counter attack action, using a multi-dimensional protection surface in accordance with an embodiment of the invention. The mitigation action is determined based on at least two dimensions in the protection surface to efficiently secure the protected entity. In one embodiment, one of the dimensions in the protection surface is a type of attack tool that performs the attack. Thus, the security policy includes an attack mitigation action that is a counter attack against the tool that performs the attack.

At S410, data traffic directed to the protected entity is analyzed to detect potential threats including, but not limited to, network-based DoS, application-based DoS, network scanning, application scanning (e.g., application vulnerability scans, Bruteforce attacks), intrusion attempts, viruses, worms, and so on. At S420, once a potential threat has been identified, the type of the tool(s) participating in the attack is identified. In one embodiment, this is performed by recognizing the footprint or fingerprint of each attack tool that generates the attack. Optionally, other inputs that can be utilized to define the multi-dimensional protection surface are gathered. For example, the origin of the attack, the time of the attack, a location of the attacked entity, and so on. At S430, all the information detected with regard to the potential threat is saved, for example, in the data repository 240.

At S440, a multi-dimensional protection surface is generated by correlating at least two of the detected inputs, where each detected input is placed on a different axis of the protection surface. In addition, the multi-dimensional protection surface includes an output axis that lists possible mitigation actions that can be applied to block the attack.

At S450, based on the multi-dimensional protection surface, at least one protection surface point for the protected entity is defined. A protection surface point correlates between the characteristics of the attack, as defined by the input axes, and the recommend mitigation attack, as defined by the output axis. The selection of the appropriate mitigation action may be based on learnt information saved in the data repository 240, a predefined set of correlation rules, an optimization process, or combination thereof.

It should be noted that different protection surface points, hence the attack mitigation action, can be defined for the same protected entity and the detected threat. In addition, a policy is defined as at least which inputs to include into consideration when generating the protection surface and/or protection point. For example, a "conservative" policy may include a protection surface point that defines certain mitigation actions only if at least two matching criteria on the surface plane are met (e.g., attack tool and attack pattern) combined with the time of the day. As another example, an "aggressive" policy may require only one criterion to match an aggressive action, such as a traffic blocking.

Following is a non-limiting example for the embodiments described above. A low orbit ion cannon (LOIC) is an open source DoS attack tool that has been used in various known attack cases against large organizations. A LOIC attack tool has three different modes UDP, TCP, and HTTP. In the UDP or TCP modes, the tool sends multiple UDP or TCP packets (respective of the operation mode) containing arbitrary text data to a designated IP and port. In the HTTP mode, the tool sends multiple HTTP GET requests to a designated IP/URL and port.

The mitigation action that can be performed to block a DoS attack usually includes dropping packets, i.e., reducing the amount of traffic that the protected entity should process. In addition, a counter action against the LOIC tool can be performed to idle its operation. An example for such a counter attack is sending a reset packet to the attack tool. However, such an action may be efficient only in the TCP/HTTP modes of operation of the attack tool. Thus, based on this information, according to the embodiments discussed above, different protection surface points, and hence security policies can be defined. For instance, if the X-axis represents the attack tool that is used (in this case the LOIC), the Y-axis represents the detected attack (e.g., HTTP DoS flood), and the Z-axis represents mitigation actions, then the following protection surface point (PSP) having coordinates <X, Y, Z> may be set as follows:

$PSP_1$=<LOIC, HTTP DoS, Drop and Send Reset Packets>

The action (Z) has been selected to ensure the most efficient counter attack mitigation action based on the tool and attack. The selected action resets the connection to the LOIC tool, thus causes the LOIC tool to halt its operation for a long period of time before generating the attack again.

Another example for a PSP that is defined for an attack generated by a TCP congestion based tool is as follows:

$PSP_2$=<LOIC, TCP raw DOS, Drop packet in the middle of the session>

In this case, the attack tool initiates a TCP slow-start operation or one of the congestion avoidance known algorithms that eventually results in full consumption of all of its TCP stack resources.

The protection surface point determines the security policy that applies to protect the protected entity.

The foregoing detailed description has set forth a few of the many forms that different embodiments of the invention can take. It is intended that the foregoing detailed description be understood as an illustration of selected forms that the invention can take and not as a limitation to the definition of the invention.

Most preferably, the principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A security system for protecting a protected entity using a multi-dimensional protection surface, comprising:
   a detection module for detecting at least one potential attack against the protected entity in incoming data traffic directed to the protected entity, wherein the detection module further detects a type of each attack tool committing the at least one potential attack;
   a data repository for storing at least a list of attack tools and for each of the attack tools its operational limitation with respect of each attack that can be performed by the attack tool;
   a correlation module for generating at least a multi-dimensional protection surface by correlating a plurality of inputs related to the at least one detected attack, wherein the plurality of inputs include at least a first input identifying the at least one detected attack and a second input identifying each attack tool that performs at least one detected attack, wherein the protection multi-dimensional surface includes at least one protection point that defines at least one attack mitigation action to mitigate the at least one detected attack, wherein the attack mitigation action exploits the operational limitation of the attack tool that performs the at least one detected attack; and
   a mitigation module for executing the at least one attack mitigation action defined in the multi-dimensional protection surface.

2. The security system of claim 1, wherein the at least one attack mitigation action is a counter attack executed against the each attack tool, wherein the counter attack exploits an operational limitation in the each attack tool.

3. The security system of claim 1, wherein the plurality of inputs further includes at least one of: a source network address of the incoming traffic, application attributes associated with a protocol of the incoming traffic, a time of the at least one detected attack, a location of the protected entity, and an origin of the at least one detected attack.

4. The security system of claim 1, wherein the correlation module is configured to correlate the plurality of inputs to generate the protection surface based on at least one of: information stored in the data repository, a set of correlation rules, and an optimization process.

5. The security system of claim 4, wherein the optimization process comprises:
   selecting at least one mitigation action out of a set of mitigation actions;
   executing the selected mitigation action against the at least one attack tool;
   determining an effectiveness of the selected mitigation action over a period of time;
   assigning a score to the effectiveness of the selected mitigation action; and
   repeating for each mitigation action in the set of mitigation actions, until a mitigation action that achieves the highest score is determined.

6. The security system of claim 5, wherein the mitigation action that achieves the highest score is recorded in the data repository.

7. The security system of claim 5, wherein the effectiveness of the selected mitigation action is determined based on its ability to exploit an operational limitation of the at least one attack tool.

8. The security system of claim 1, wherein the multi-dimensional protection surface is generated based on a security policy defined for the protected entity, wherein the security policy defines at least a number of inputs out of the plurality of inputs to correlate when generating the multi-dimensional protection surface.

9. The security system of claim 1, wherein the at least one detected attack is at least one of: a network-based denial of service (DoS) attack, an application-based (DoS) attack, a network scanning attack, an application scanning attack, an intrusion attempt, a virus, and a worm.

10. The security system of claim 1, wherein the protected entity is at least one of: a computer, a web server, a mail server, an FTP server, a SIP server, a DNS server, a database server, a datacenter, a media server, and a network infrastructure component.

11. The security system of claim 1, wherein the security system is integrated in any one of: a firewall, an IPS, and an anti-DoS device, and the security system is deployed as any one of an inline traffic system and a scrubbing-center.

12. The security system of claim 1, wherein the detection module, the correlation module, the mitigation module and the data repository are distributed components of the security system.

13. A computer-implemented method for protecting a protected entity using a multi-dimensional protection surface, comprising:
   detecting at least one potential attack against the protected entity in incoming data traffic directed to the protected entity;
   detecting a type of each attack tool committing the at least one potential attack;
   generating a multi-dimensional protection surface by correlating a plurality of inputs related to the at least one detected attack, wherein the plurality of inputs include at least a first input identifying the at least one detected attack and a second input identifying each attack tool that performs the at least one detected attack, wherein the protection multi-dimensional surface includes at least one protection point that defines at least one attack mitigation action to mitigate the at least one detected attack, wherein the attack mitigation action exploits the operational limitation of the attack tool that performs the at least one detected attack; and
   executing the at least one attack mitigation action defined in the multi-dimensional protection surface.

14. The method of claim 13, wherein the at least one attack mitigation action is a counter attack executed against each attack tool, wherein the counter attack exploits an operational limitation in the each attack tool.

15. The method of claim 13, wherein the plurality of inputs further include at least one of: a source network address of the incoming traffic, application attributes associated with a protocol of the incoming traffic, a time of the at least one detected attack, a location of the protected entity, and an origin of the at least one detected attack.

16. The method of claim 13, wherein the correlation module is configured to correlate the plurality of inputs to generate the protection surface based on at least one of: a list of attack tools and for each of the attack tools its operational limitation with respect of each attack that can be performed by the attack tool, a set of correlation rules, and an optimization process.

17. The method of claim 16, wherein the optimization process comprises:

selecting at least one mitigation action out of a set of mitigation actions;

executing the selected mitigation action against the at least one attack tool;

determining an effectiveness of the selected mitigation action over a period of time;

assigning a score to the effectiveness of the selected mitigation action; and repeating for each mitigation action in the set of mitigation actions, until a mitigation action that achieves the highest score is determined.

18. The method of claim 17, wherein the mitigation action that achieves the highest score is recorded in the data repository.

19. The method of claim 17, wherein the effectiveness of the selected mitigation action is determined based on its ability to exploit an operational limitation of the at least one attack tool.

20. The method of claim 13, wherein the multi-dimensional protection surface is generated based on a security policy defined for the protected entity, wherein the security policy defines at least a number of inputs out of the plurality of inputs to correlate when generating the multi-dimensional protection surface.

21. The method of claim 13, wherein the at least one detected attack is at least one of: a network-based denial of service (DoS) attack, an application-based (DoS) attack, a network scanning attack, an application scanning attack, an intrusion attempt, a virus, and a worm.

22. A non-transitory computer readable medium having stored thereon instructions for causing one or more processing units to execute the method according to claim 13.

* * * * *